(12) United States Patent
Koskela et al.

(10) Patent No.: US 8,982,749 B2
(45) Date of Patent: Mar. 17, 2015

(54) SYSTEM AND METHOD FOR PROVIDING CLOSED SUBSCRIBER GROUPS IN A PACKET-BASED WIRELESS COMMUNICATION SYSTEM

(75) Inventors: Jarkko Tuomo Koskela, Oulu (FI); Lars Dalsgaard, Oulu (FI)

(73) Assignee: Nokia Corporation, Espoo (FI)

( * ) Notice: Subject to any disclaimer, the term of this patent is extended or adjusted under 35 U.S.C. 154(b) by 454 days.

(21) Appl. No.: 12/406,279

(22) Filed: Mar. 18, 2009

(65) Prior Publication Data

US 2010/0110945 A1 May 6, 2010

Related U.S. Application Data

(60) Provisional application No. 61/037,638, filed on Mar. 18, 2008.

(51) Int. Cl.
*H04B 7/00* (2006.01)
*H04W 48/20* (2009.01)
*H04J 11/00* (2006.01)

(52) U.S. Cl.
CPC .......... *H04W 48/20* (2013.01); *H04J 11/0069* (2013.01)
USPC ....................................... 370/310

(58) Field of Classification Search
None
See application file for complete search history.

(56) References Cited

U.S. PATENT DOCUMENTS

2009/0047960 A1* 2/2009 Gunnarsson et al. ......... 455/436
2009/0070694 A1* 3/2009 Ore et al. ..................... 715/764
2009/0093232 A1* 4/2009 Gupta et al. .................. 455/410

FOREIGN PATENT DOCUMENTS

JP 2006-228209 A 8/2006

OTHER PUBLICATIONS

Mobility and Security Management ED—Mouly M; Pautent M-B, GSM System for Mobile Communications, XP000860007, Jan. 1, 1993, p. 432-498.
3rd Generation Partnership Project, Technical Specification Group Radio Access Network, Evolved Universal Terrestrial Radio Access, User Equipment Procedures in Idle Mode; 3GPP TS 36304 V8.1.0, Mar. 17, 2008, p. 1-29.
3rd Generation Partnership Project, Technical Specification Group Radio Access Network, Evolved Universal Terrestrial Radio Access and Evolved Universal Terrestrial Radio Access Network, 3GPP TS 36300 V8.4.0, p. 1-126.

(Continued)

*Primary Examiner* — Kouroush Mohebbi
(74) *Attorney, Agent, or Firm* — Harrington & Smith

(57) ABSTRACT

Systems and methods for providing radio frequency transceiver user equipment in a packet based radio frequency signaling communication system are disclosed. User equipment is provided with closed subscriber group "CSG" capability including permanent storage for a CSG whitelist, the whitelist including identifiers of CSGs the user equipment is a member of. Base stations transmit signals including identifiers corresponding to CSGs the base station supports. The base station or cell selection process performed by the user equipment includes selecting cells that are part of the CSG whitelist. In additional embodiments, the user equipment includes user alterable storage for a user controlled CSG whitelist. The user alterable storage may further be partitioned into permanent and temporary portions. In an exemplary method, the user controls the cell selection process using the CSG whitelist information stored in the user equipment. Methods for managing the CSG whitelist are described.

20 Claims, 8 Drawing Sheets

(56) References Cited

OTHER PUBLICATIONS

International Search Report and Written Opinion Relating to Application No. PCT/IB2009/000546 sent on Jul. 20, 2009, p. 1-14.
Japanese Office Action issued Sep. 21, 2012 for corresponding JP Patent Application No. 2011-500305.
Michael Sanders, John M Meredith, 3GPP Change Request, Technical Specification Group Services and System Aspects TSGS#38(08)0188, Mar. 11, 2008, pp. 1-6.
3GPP TSG RAN #60bis, Seville, Spain, Jan. 14-18, 2008, R2-080002, T-Mobile, "CSG and Idle Mode Mobility", (28 pages).
3GPP TS 36.300 V8.3.0 (Dec. 2007), Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8), (121 pages).

* cited by examiner

SYSTEM AND METHOD FOR PROVIDING CLOSED SUBSCRIBER GROUPS IN A PACKET-BASED WIRELESS COMMUNICATION SYSTEM

RELATED APPLICATION

This application claims the benefit of U.S. Provisional Application No. 61/037,638, filed on Mar. 18, 2008, which is incorporated herein by reference.

TECHNICAL FIELD

The present invention is directed, in general, to communication systems and, more particularly, to a system and method for providing the use of closed subscriber group functions in a packet or circuit based communication system that includes discontinuous reception, VoIP packet support and wireless devices while allowing for efficient use, simple implementation and conservation of system resources.

BACKGROUND

As wireless communication systems such as cellular telephone, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

The Third Generation Partnership Project Long Term Evolution ("3GPP LTE") is the name generally used to describe an ongoing effort across the industry to improve the universal mobile telecommunications system ("UMTS") for mobile communications. The improvements are being made to cope with continuing new requirements and the growing base of users. Goals of this broadly based project include improving communication efficiency, lowering costs, improving services, making use of new spectrum opportunities, and achieving better integration with other open standards and backwards compatibility with some existing infrastructure that is compliant with earlier standards. The project envisions a packet switched communications environment with support for such services as Voice over Internet Protocol ("VoIP") and Multimedia Broadcast/Multicast Services ("MBMS"). MBMS may support services where base stations transmit to multiple user equipment simultaneously, such as mobile television or radio broadcasts, for example. The 3GPP LTE project is not itself a standard-generating effort, but will result in new recommendations for standards for the UMTS.

The UMTS Terrestrial Radio Access Network ("UTRAN") includes multiple Radio Network Subsystems ("RNS"), each of which contains at least one Radio Network Controller ("RNC"). However, it should be noted that the RNC may not be present in the actual implemented systems incorporating Long Term Evolution ("LTE") of UTRAN ("E-UTRAN"). LTE may include a centralized or decentralized entity for control information. In UTRAN operation, each RNC may be connected to multiple Node Bs which are the UMTS counterparts to Global System for Mobile Communications ("GSM") base stations. In E-UTRAN systems, the eNode B may be, or is, connected directly to the access gateway ("aGW," sometimes referred to as the services gateway "sGW"). Each Node B may be in radio contact with multiple UE devices (generally, user equipment including mobile transceivers or cellular phones, although other devices such as fixed cellular phones, mobile web browsers, laptops, PDAs, MP3 players, and gaming devices with transceivers may also be UE) via the radio Uu interface.

The wireless communication systems as described herein are applicable to, for instance, 3GPP LTE compatible wireless communication systems and of interest is an aspect of LTE referred to as "evolved UMTS Terrestrial Radio Access Network," or E-UTRAN. In general, E-UTRAN resources are assigned more or less temporarily by the network to one or more UE devices by use of allocation tables, or more generally by use of a downlink resource assignment channel or physical downlink control channel ("PDCCH"). LTE is a packet-based system and, therefore, there may not be a dedicated connection reserved for communication between a UE and the network. Users are generally scheduled on a shared channel every transmission time interval ("TTI") by a Node B or an evolved Node B ("eNode B"). A Node B or an eNode B controls the communications between user equipment terminals in a cell served by the Node B or eNode B. In general, one Node B or eNode B serves each cell. A Node B may be referred to as a "base station." Resources needed for data transfer are assigned either as one time assignments or in a persistent/semi-static way. The LTE, also referred to as 3.9G, generally supports a large number of users per cell with quasi-instantaneous access to radio resources in the active state. It is a design requirement that at least 200 users per cell should be supported in the active state for spectrum allocations up to 5 megahertz ("MHz"), and at least 400 users for a higher spectrum allocation.

The types of UEs the E-UTRAN environment can accommodate are many. One type of UE service that is presently proposed to be supported in E-UTRAN systems is a UE that includes support for one or more closed subscriber groups ("CSG"). A closed subscriber group, for purposes of this application, is a group of one or more cells (eNode B stations, or base stations) on which the access is restricted to a limited group of one or more users, and which is not generally available for "public" access on the network. This type of UE, when registering with eNode B devices, can communicate with certain eNode B stations that are available only to a limited group of UE devices. Examples include arranging an eNode B in a residence, office, apartment building, or area so that only certain subscriber group UEs may register with and communicate with the eNode B station (typically referred to as a "cell"). A single UE may be a member of multiple CSGs. A single cell may support multiple CSGs. The need to accommodate the CSG functions in the environment poses several problems for the system. A need thus exists for methods and apparatus to efficiently support the CSG functions for eNode Bs and UEs in the E-UTRAN environment. The addition of support for CSG must have a minimum impact on the efficiency and operation of the remaining services in the environment, the other UEs, the eNode B devices, and mobile management entities ("MMEs").

SUMMARY OF THE INVENTION

These and other problems are generally solved or circumvented, and technical advantages are generally achieved, by advantageous embodiments of the present invention, which include an apparatus and methods according to an embodiment for providing CSG, UE and eNode Bs supporting the CSG services.

According to an illustrative embodiment, a communication terminal such as a UE (typically a mobile phone or cell phone) is provided that may implement a CSG function. The communication terminal may also include automatic and manual cell selection using a CSG list ("CSG whitelist" or "Allowed CSG List"). The user may configure a storage area within the UE to add permanent cells to the CSG whitelist, and the communication terminal may also keep a list of recently used cells in a temporary CSG whitelist.

According to another illustrative embodiment, a communication terminal such as a UE is provided that may include means for receiving, from a network, entries for a CSG whitelist. If the CSG list is not provided by the network, the UE may, in another embodiment, begin building a CSG whitelist using stored or acquired information. A user interface may be provided to allow a user of the UE to enter CSG information into the whitelist for permanent or temporary CSG storage.

In an alternate illustrative embodiment, a CSG storage handler may be included in the UE and may store information to non-volatile memory to implement the CSG whitelist.

In an alternate embodiment, a user may remove a closed subscriber group ("CSG") from the whitelist. In one exemplary method, if the UE is presently communicating with the cell that corresponds to the removed CSG, the UE will perform a cell reselection and select a different cell. If the UE is currently camped on a cell that is a member of a closed subscriber group that is removed from the list, the whitelist should be updated and the UE should select another cell. If the UE is not presently communicating with that cell, the CSG whitelist will be updated and that CSG entry will be eliminated from the list.

In another exemplary embodiment, the CSG whitelist storage is provided in partitioned areas. A permanent area may contain CSG entries provided by the network to the UE. In one exemplary embodiment, this area may only be altered when the UE is first initialized, or alternatively it may be altered by the network but not by the user. This portion of the whitelist is protected from access by the user. Another permanent area may store entries the user of the UE provides. In this permanent area, the user may enter CSG information for a home cell or eNode B station, a work cell or eNode B station, and so on. Finally, in an exemplary embodiment, a temporary CSG area is provided. This area stores CSG information about cells or eNode B stations that UE has previously used and registered with. The temporary list rotates on a space available basis; once the whitelist in this area is full, new entries replace older ones, or entries that are least used.

In another exemplary embodiment, when performing cell selection at power up or at other times, the UE may be made to automatically search for cells that are on the CSG whitelist. Cells or eNode B stations will transmit CSG information in their beacon signals so that the UEs can know which CSGs the cells belong to. In another exemplary embodiment, this search may be user controlled. By searching for these preferred cells first, power for the battery powered UE may be conserved, and cell selection may be performed faster. In one alternative embodiment, the UE may automatically background scan for cells on the whitelist and may indicate to the user when such a cell is located. Alternatively, the UE may automatically background scan one or more specific cells on the whitelist. In another alternative embodiment, the background scan may be set to scan for any CSG cell that may be located in the vicinity of the UE, disregarding whether they belong to a CSG on the whitelist. In another alternative embodiment, the UE may compare additional identified cells that are members of the CSG whitelist and automatically select the best cell based on reception, power, loading or other parameters.

In an additional exemplary embodiment, the cell selection (or reselection) process may be configured by the user to automatically search only for the cells that are in the permanent CSG whitelist from the network, for cells that are in any permanent CSG list including user entered cells, for cells that are in any portion of the stored CSG list, or for any cells that are available. In one alternative embodiment, the UE may automatically background scan for cells on the permanent CSG whitelist and may indicate to the user that additional cells have been located that belong to a CSG on the permanent CSG whitelist. In another alternative embodiment, the UE may compare additional identified cells that are members of the permanent CSG whitelist and automatically select the best cell based on reception, power, loading or other parameters.

By allowing the user to control how the cell selection or background scanning is done, the user may control which cell the UE identifies and conserve battery power used in the selection task. The user may, in another exemplary embodiment, identify particular cells for selection and further limit the time and power consumed by the UE in the cell selection and/or background scan tasks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION

Figure 1:
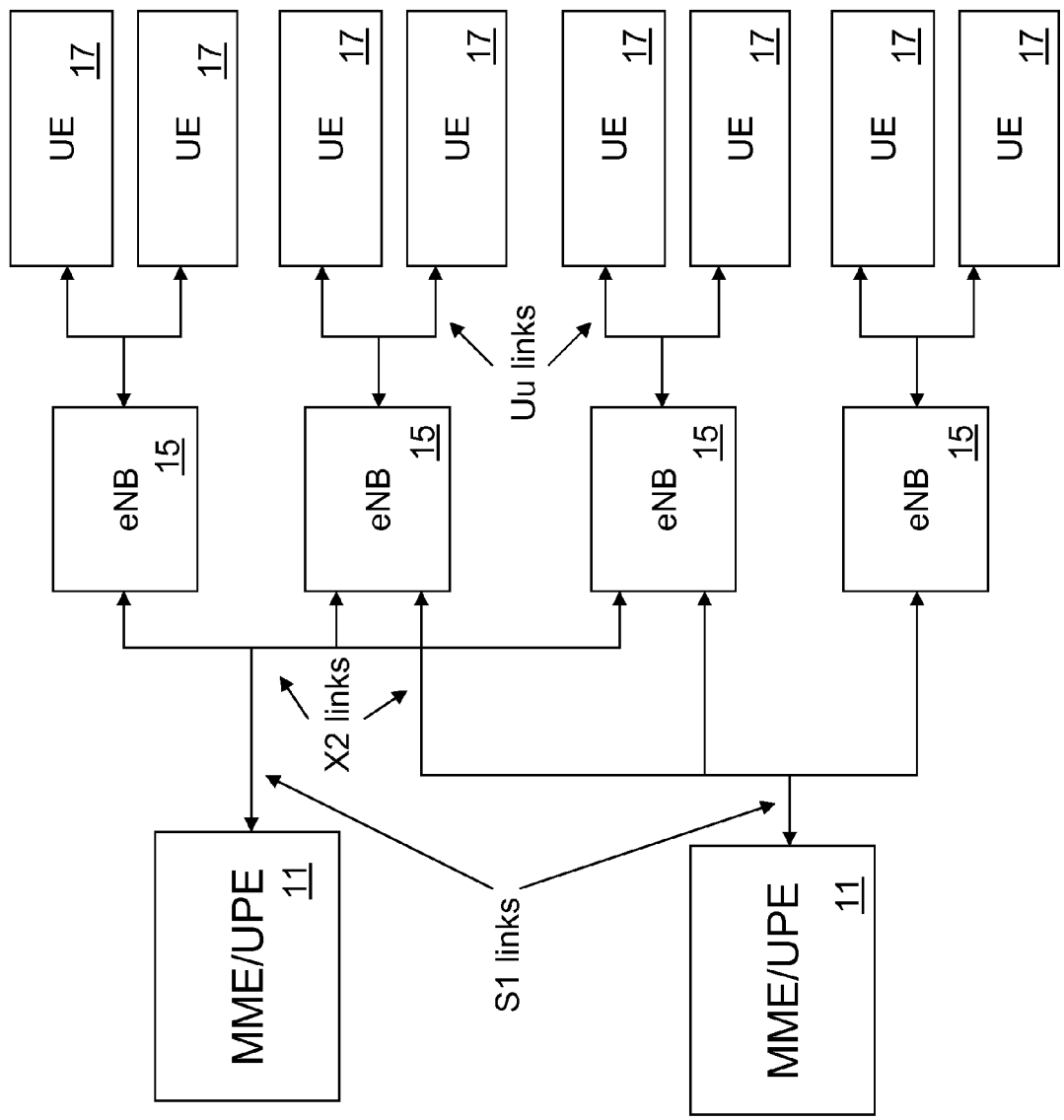
FIG. 1 illustrates a communications system according to an advantageous embodiment of the present invention.

Referring initially to FIG. 1, illustrated is a system level diagram of a radio frequency interface communication system including a wireless communication system that provides an environment for the application of the principles of the present invention. The wireless communication system may be configured to provide features included in the evolved UMTS terrestrial radio access network ("E-UTRAN") universal mobile telecommunications services. Mobile management entities ("MMEs") 11 and user plane entities ("UPEs") provide control functionality for one or more E-UTRAN node B (designated "eNB," an "evolved node B," also commonly referred to as a "base station") 15 via an S1 interface or communication link. The base stations 15 also communicate via an X2 interface or communication link. The various communication links are typically fiber, microwave, or other high-frequency metallic communication paths such as coaxial links, or combinations thereof.

The base stations 15 communicate over an air interface with user equipment 17 (designated "UE"), which is typically a mobile transceiver carried by a user. Alternatively, the user equipment 17 may be a mobile web browser, text messaging appliance, a laptop with a mobile PC modem, or other user device configured for cellular or mobile services. Thus, communication links (designated "Uu" communication links) coupling the base stations to the user equipment are air links employing a wireless communication signal. For example, the devices may communicate using a known signaling approach such as a 1.8 GHz orthogonal frequency division multiplex ("OFDM") signal. Other radio frequency signals may be used.

Figure 2:
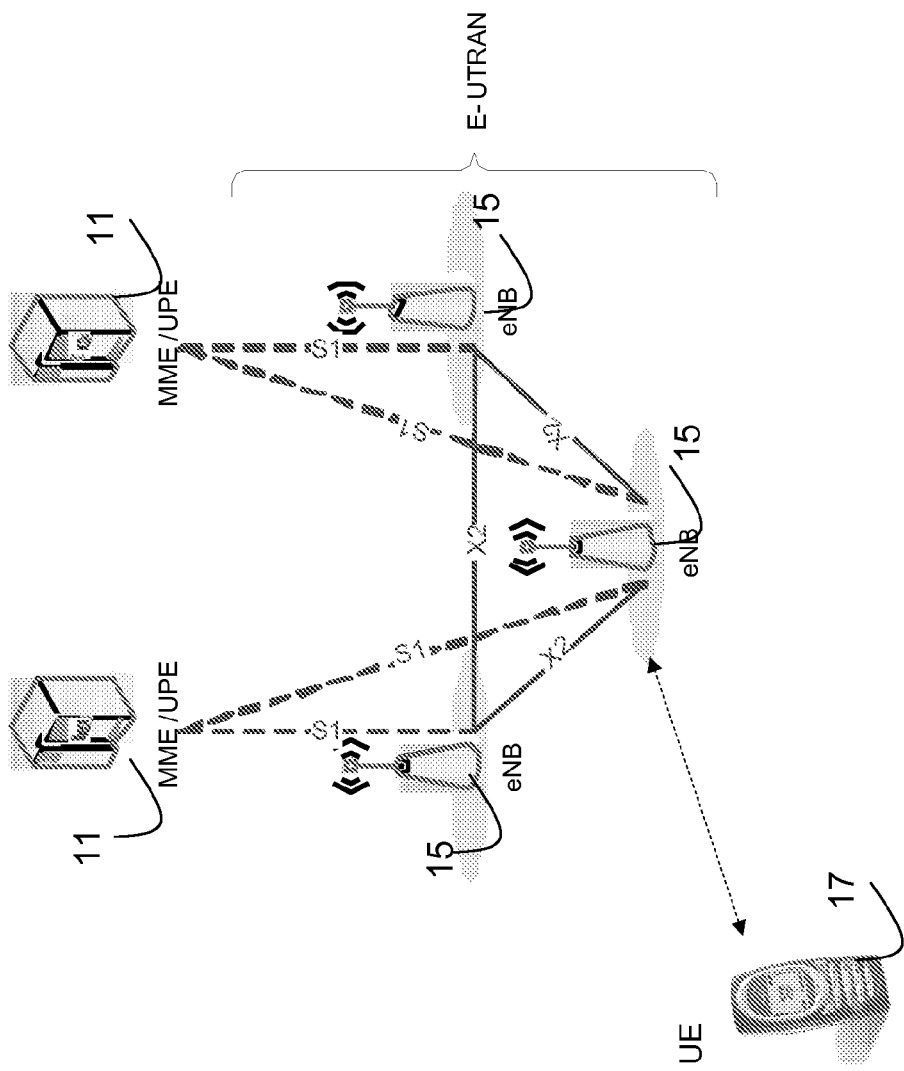
FIG. 2 illustrates user equipment communicating to an eNode B over an air interface, and an E-UTRAN communications system according to an advantageous embodiment of the present invention.

FIG. 2 illustrates in a system level diagram a communication system including a wireless communication system that provides an environment for the application of the principles of the present invention. The wireless communication system provides an E-UTRAN architecture including base stations 15 (designated in the LTE 3GPP nomenclature as eNode B or "eNBs") providing E-UTRAN user plane (packet data convergence protocol/radio link control/media access control/physical transport) and control plane (radio resource control) protocol terminations directed towards user equipment 17 (designated as "UE"). The base stations 15 are interconnected with an X2 interface or communication link. The base stations are also connected by an S1 interface or communication link to an evolved packet core ("EPC") including, for instance, a mobility management entity ("MME") and a user plane entity ("UPE") 11, which may form an access gateway ("aGW," a system architecture evolution gateway). The S1 interface supports a multiple entity relationship between the mobility management entities/user plane entities and the base stations and supports a functional split between the mobility management entities and the user plane entities.

The base stations 15 may host functions such as radio resource management (e.g., internet protocol ("IP"), header compression and encryption of user data streams, ciphering of user data streams, radio bearer control, radio admission control, connection mobility control, and dynamic allocation of resources to user equipment in both the uplink and the downlink), selection of a mobility management entity 11 at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobility management entity/user plane entity 11 may host functions such as distribution of paging messages to the base stations, security control, terminating user plane ("U-plane") packets for paging reasons, switching of U-plane for support of the user equipment mobility, idle state mobility control, and system architecture evolution bearer control. The user equipment 17 receives an allocation of a group of information blocks from the base stations.

Figure 3:
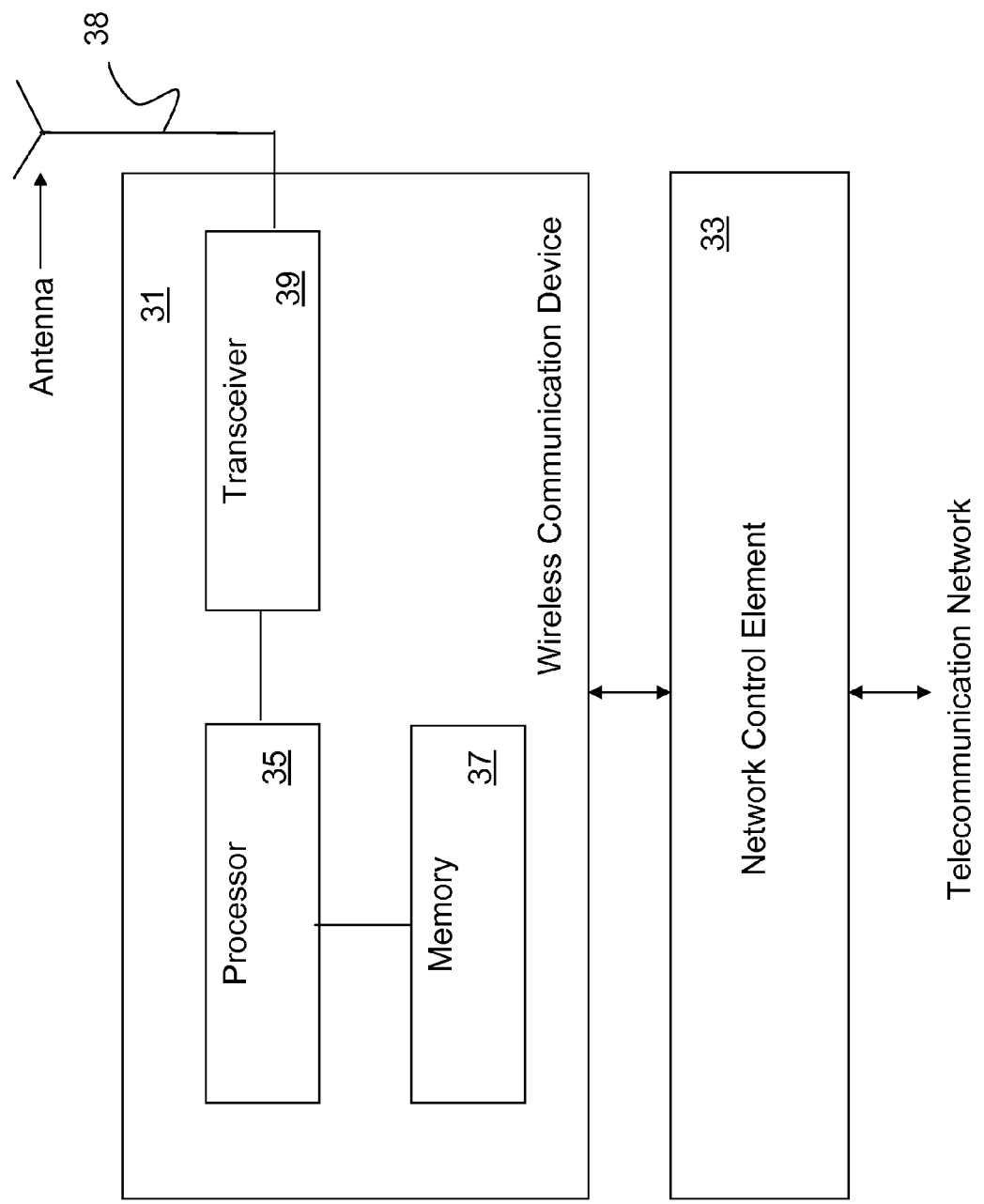
FIG. 3 illustrates a block diagram of a communication terminal according to an advantageous embodiment of the present invention.

FIG. 3 illustrates a simplified system level diagram of an example communication element 31 of a communication system that provides an environment and structure for application of the principles of the present invention. The communication element 31 may represent, without limitation, an apparatus including a base station, user equipment, such as a terminal or mobile station, a network control element, or the like. The communication element 31 includes, at least, a processor 35, memory 37 that stores programs and data of a temporary or more permanent nature, an antenna 38, and a radio frequency transceiver 39 coupled to the antenna and the processor for bidirectional wireless communication. Other functions may also be provided. The communication element may provide point-to-point and/or point-to-multipoint communication services.

The communication element, such as a base station in a cellular network, may be coupled to a communication network element 33, such as a network control element of a public switched telecommunication network. The network control element may in turn be formed with a processor, memory, and other electronic elements (not shown). The network control element generally provides access to a telecommunication network such as a public switched telecommunication network ("PSTN"). Access may be provided using fiber optic, coaxial, twisted pair, microwave communication, or similar communication links coupled to an appropriate link-terminating element. A communication element formed as a mobile station is generally a self-contained device intended to be carried by an end user; however, in areas where wired services are not available, the mobile station may be permanently installed at a fixed location as well.

The processor 35 in the communication element 31, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor 35 of the communication element 31 may be of any type suitable to the local application environment, and may include one or more of general-purpose computers, special-purpose computers, microprocessors, digital signal processors ("DSPs"), and processors based on a multi-core processor architecture, as non-limiting examples.

The transceiver 39 of the communication element 31 modulates information onto a carrier waveform for transmission by the communication element via the antenna 38 to another communication element. The transceiver demodulates information received via the antenna 38 for further processing by other communication elements.

The memory 37 of the communication element 31, as introduced above, may be of any type suitable to the local application environment, and may be implemented using any suitable volatile or non-volatile data storage technology, such as a semiconductor-based memory device, a magnetic memory device and system, an optical memory device and system, fixed memory, and removable memory. The programs stored in the memory 37 may include program instructions that, when executed by an associated processor, enable the communication element to perform tasks as described herein. Exemplary embodiments of the system, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element as illustrated and described above.

Figure 4:
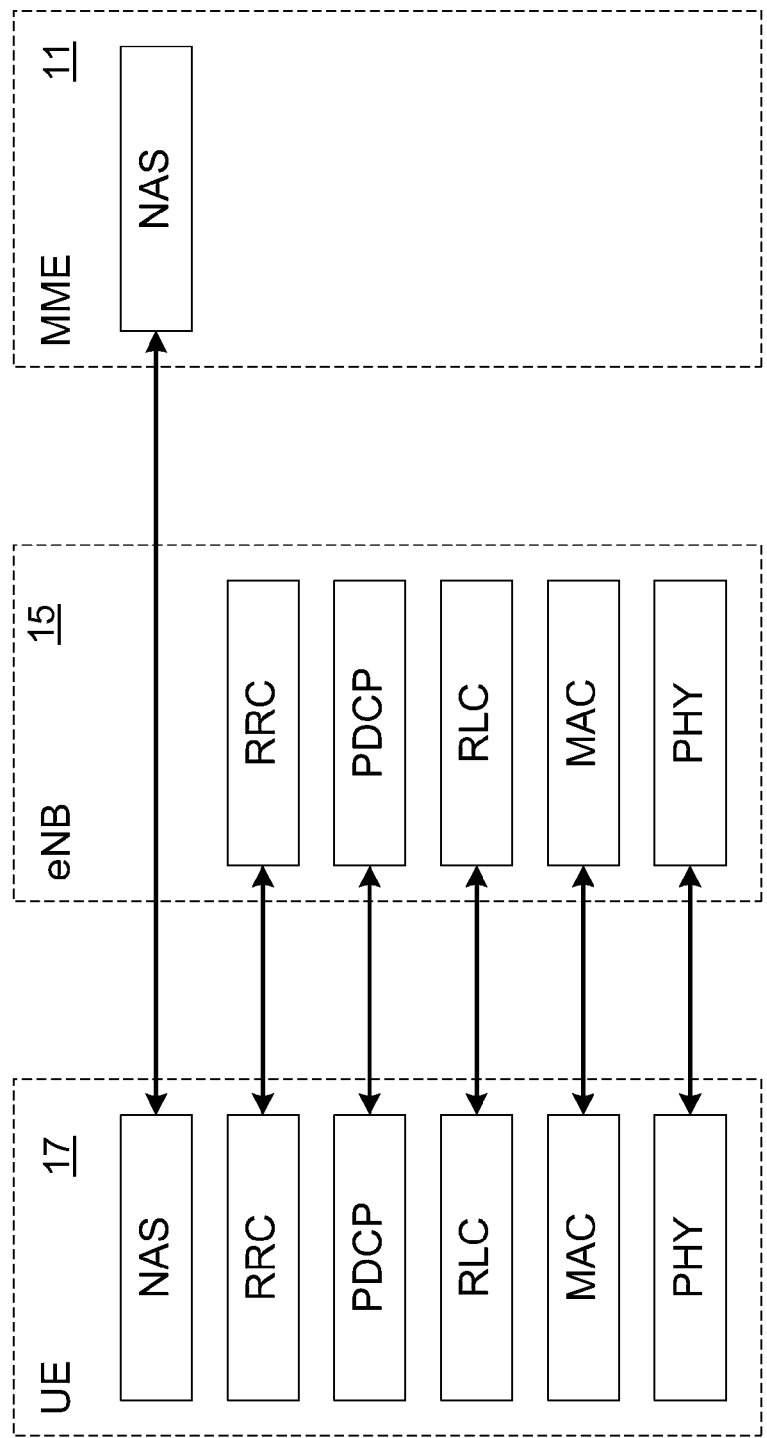
FIG. 4 illustrates communication layers of a UE, eNB and MME according to an advantageous embodiment of the present invention.

FIG. 4 depicts a block diagram of an embodiment of user equipment 17 and a base station 15 constructed according to the principles of the present invention. The user equipment UE 17 and the base station eNB 15 each include a variety of layers and subsystems: the physical layer ("PHY") subsystem, a medium access control layer ("MAC") subsystem, a radio link control layer ("RLC") subsystem, a packet data convergence protocol layer ("PDCP") subsystem, and a radio resource control layer ("RRC") subsystem. Additionally, the user equipment and the mobile management entity 11 ("MME") include a non-access stratum ("NAS") subsystem.

The physical layer subsystem supports the physical transport of packets over the LTE air interface and provides, as non-limiting examples, cyclic redundancy check ("CRC") insertion (e.g., a 24 bit CRC is a baseline for physical downlink shared channel ("PDSCH"), channel coding, physical layer hybrid-automatic repeat or retransmit request ("HARQ") processing, and channel interleaving. The physical layer subsystem also performs scrambling such as transport-channel specific scrambling on a downlink-shared channel ("DL-SCH"), broadcast channel ("BCH") and paging channel ("PCH"), as well as closed multicast channel ("MCH") scrambling for all cells involved in a specific multimedia broadcast multicast service single frequency network ("MBSFN") transmission. The physical layer subsystem also performs signal modulation such as quadrature phase shift keying ("QPSK"), 16 quadrature amplitude modulation ("QAM") and 64 QAM, layer mapping and pre-coding, and mapping to assigned resources and antenna ports. The media access layer or MAC performs the HARQ functionality and other important functions between the logical transport layer, or Level 2, and the physical transport layer, or Level 1.

Each layer is implemented in the system and may be implemented in a variety of ways. A layer such as the PHY in the UE may be implemented using hardware, software, programmable hardware, firmware, or a combination of these as is known in the art. Programmable devices such as DSPs, reduced instruction set ("RISC"), complete instruction set ("CISC"), microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or eNode B implementations, faster and easier to perform in the design and commercial production of new devices.

Figure 5:
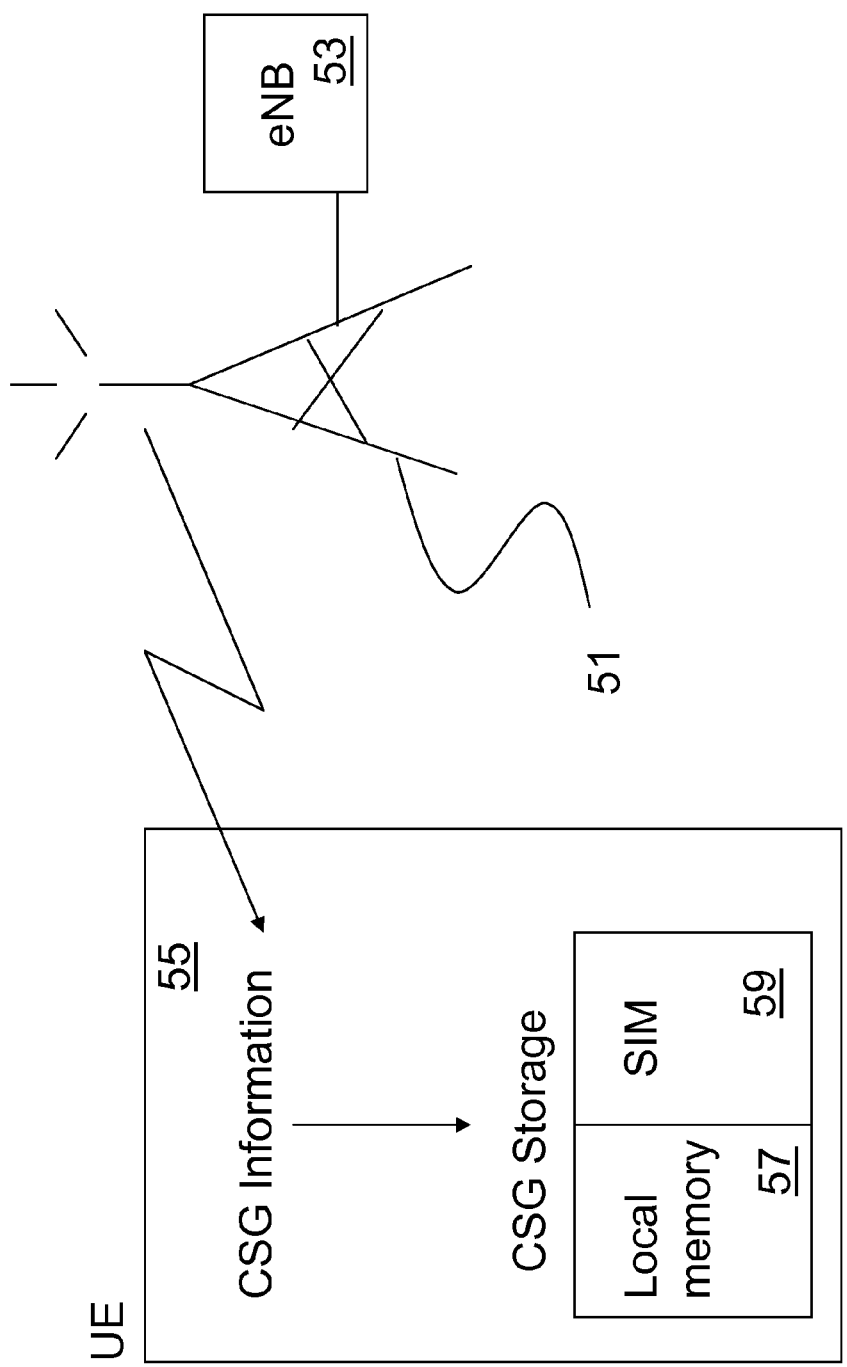
FIG. 5 illustrates a UE including a receiver for closed subscriber group ("CSG") information, CSG storage, and CSG memory portions, an antenna and an eNode B cell that may be used to implement an advantageous embodiment of the present invention.

FIG. 5 depicts a first exemplary illustrative embodiment of an environment where the present invention may be applied. In FIG. 5, a cellular base station eNB 53 transmits closed subscriber group ("CSG") information to UE 55 over the air interface using radio frequency signals via an antenna 51. The CSG information is then forwarded within the UE from a receiver area to CSG storage, which comprises in this exemplary embodiment either local memory 57, including volatile or non-volatile memory, or a removable media storage such as flash cards, smart cards, compact flash and the like, or permanent or semi-permanent storage 59 provided by the cellular provider to the UE, such as a subscriber identity module ("SIM") card, which is a non-volatile storage card. SIM cards such as 59 may be provided by the service provider when the UE is initially activated, when additional features are added, or at other times. The SIM card 59 may be moved to another UE so that the user may maintain the list of subscriber features including a user phone number, frequently called phone numbers, subscriber data features, and CSG whitelist information that are part of the services the user purchases from the service provider, and thus the user may import that SIM card into another UE to access the services without changing phone numbers or losing the subscriber information.

The CSG information includes a list of cells/accessible CSGs that the UE is a subscriber to or member of, referred to as the "CSG whitelist." In this exemplary embodiment, the network provides the CSG whitelist to the UE in accordance with the subscriber information stored in the MME or other network resource. The CSG whitelist is used by the communications system to determine which cells, CSGs, or base stations (eNode B stations or "eNB" in E-UTRAN standard terminology), the UE can register with. As the UE is used in different environments, the "whitelist" may expand to include generally open cells such as eNB equipments located in hotels, cafes, office parks and the like. The UE may gain access to these automatically, or, the user may have to enter these into a list using a user interface, for example a business may grant customers the option to become subscribers to their cell and an access code or other password may be required. As the UE is used in different environments, the UE CSG storage handler that manages the CSG whitelist may add cells to which the UE gained access in the past, that is, the cells on which the UE has previously "camped." When the UE detects a cell on the CSG whitelist, in a first exemplary embodiment, the UE may automatically register with the cell. In an alternative exemplary embodiment, the UE may ask the user for input on whether or not to register with a particular cell, or, whether to search for another cell to register with.

In another exemplary embodiment, the CSG whitelist in the UE has a portion which is maintained as a user permanent list. The user may manage the cell entries on this list, in one embodiment. For example, the user may manually add the cell at his/her home to this list using a menu or other user interface. Office cells and other places where the user is frequently located may be on this list. As an alternative exemplary embodiment, a services provider such as a cellular store may provide the CSG permanent list when the UE (typically a cell phone) is activated.

A second, optional portion of the CSG whitelist is a temporary, rotating or cyclic portion. The length of this rotating CSG whitelist is determined by the memory storage available. As the UE "camps" on different cells that the UE has access to, that is, cells including cell subscriber groups that the UE is a subscriber to, the whitelist is updated. Eventually, older entries will be replaced with newer ones. The permanent portion of the CSG whitelist should be preserved, however, so that the home cell or eNode B and other similar cells remain on the CSG whitelist stored within the UE at all times.

Figure 6:
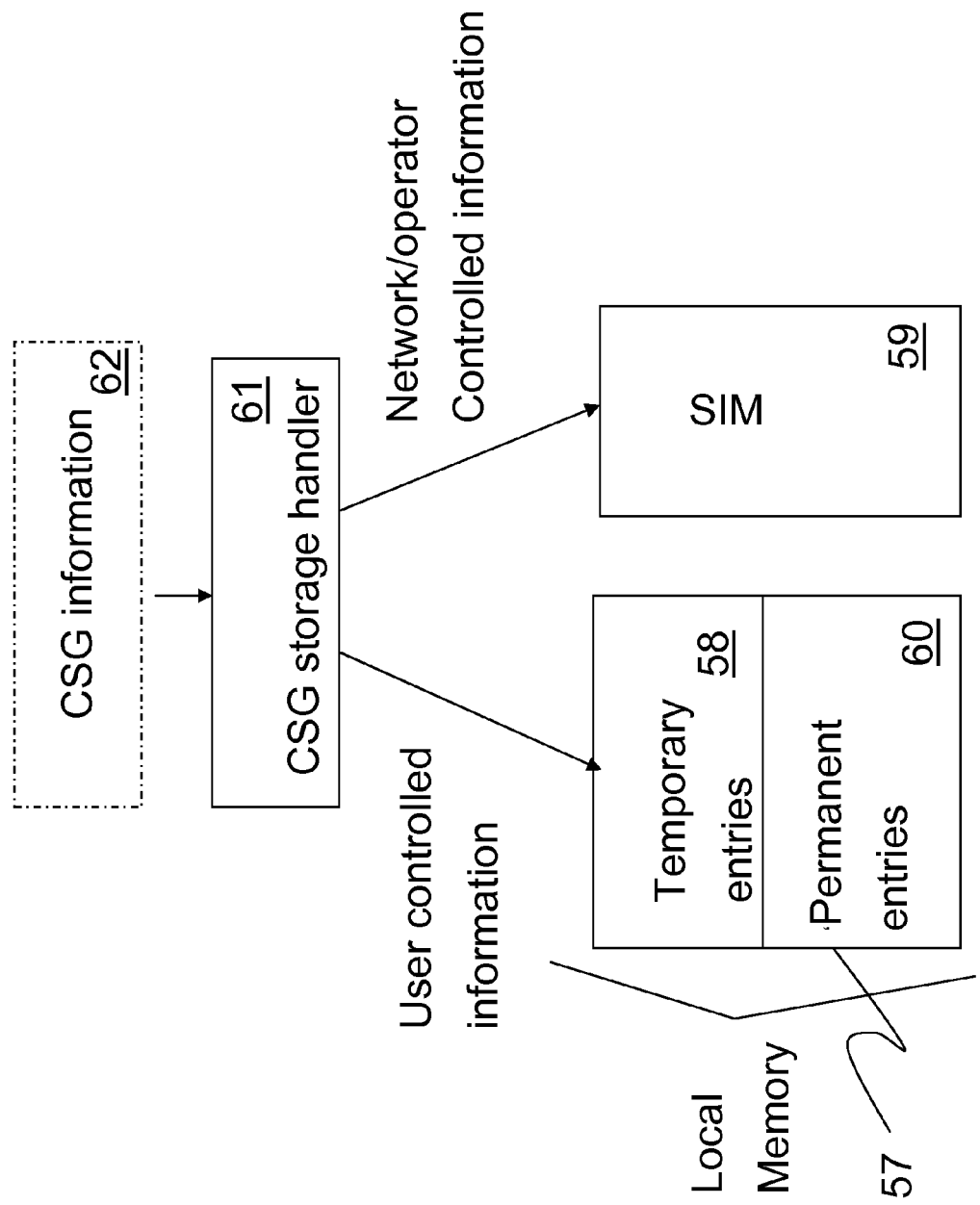
FIG. 6 illustrates additional details on the CSG memory and storage of the UE of FIG. 5 that may be used to implement an advantageous embodiment of the present invention.

FIG. 6 depicts a detailed block diagram view of the CSG functionality provided within the UE 55. CSG storage handler 61 may be implemented as hardware, using ASIC or semicustom integrated circuitry, or using a programmable device such as a microprocessor, RISC core, or a state machine. CSG storage handler 61 resides within the UE and may be part of integrated circuitry incorporating other functions of the UE, or could be implemented along with nonvolatile storage such as local memory 57 using integrated circuit technologies and semiconductor fabrication facilities available from wafer foundries, as is known in the art.

SIM card 59 may also store part of the CSG whitelist. These entries are also considered more or less permanent and may include the CSG information 62 relating to the user's home, office, university, or neighborhood, the cells where the UE is a permanent member of the closed subscriber group.

Local memory 57 is depicted having two areas of storage, user permanent entries 60 and user temporary entries 58. The user temporary entries on the CSG whitelist will include cells or eNBs where the UE has "camped" and been granted access. By maintaining the list of cells where the UE has previously successfully been used, the registration process for the UE on power up, or the re-registration process needed as the UE moves from one cell signal receiving area to another, may be made much quicker. This process is detailed below, but by providing the CSG whitelist the cell selection and registration process is made efficiently, saving battery power and time. In addition the UE may perform autonomous UE cell reselection based on user preferences, system commands or signal reception parameters. The UE may use the CSG whitelist to shorten the selection process. Background scanning for cells on the CSG whitelist may be performed periodically, on user command, or via some other scheme to autonomously reselect the cell the UE is camped on. The temporary CSG whitelist will be updated as the UE successfully camps on cells. As the UE registers with a cell not on the whitelist, the user may be prompted, through a visual or auditory prompt, and asked whether to put the cell on the CSG whitelist. Alternatively, the UE may be set to automatically update the CSG whitelist. Once the temporary CSG storage area is full, the UE may be configured to replace the less frequently used or older entries on the temporary whitelist with new entries. This may be done autonomously or with user prompts depending on the UE features provided.

Because entries are replaced on the CSG whitelist as the temporary storage area fills, a permanent area is needed. Cells in the user permanent area should not be removed unless authorized by the user, or the network, or through some other mechanism. Cells listed in the permanent area of the CSG whitelist may include an eNB or cell in the user's home, place of business, apartment building or other area where the UE is frequently located. It is important that this part of the CSG whitelist be maintained even if the UE camps on many other cells; and by partitioning the storage as shown in FIG. 6, this permanent CSG storage is easily maintained.

When a UE is powered "on" from an "off" state, it must first determine what networks are available and which network to connect to. In addition, it must identify a suitable cell, if one is available, to register with ("camp" on). Once a UE is registered with a cell on a network or "camped", the UE is active and can be paged, for example, to receive calls or data, or can initiate a call or data transmission.

At power up, the public land mobile network ("PLMN") is selected based on various criteria. In one embodiment, the UE can automatically select the network, or, in an alternative approach, the UE can prompt the user, listing available networks, and the user can select a network. The UE must monitor radio transmissions from cells to determine what networks are available for selection. Part of the beacon signals transmitted from the cells or eNBs includes the information identifying the CSGs the cell supports.

Following the network or PLMN selection, the UE must select a cell. The added functionality of the CSG, and the CSG whitelist, will affect the cell selection, cell reselection and background scanning processes and is further described below.

Figure 7:
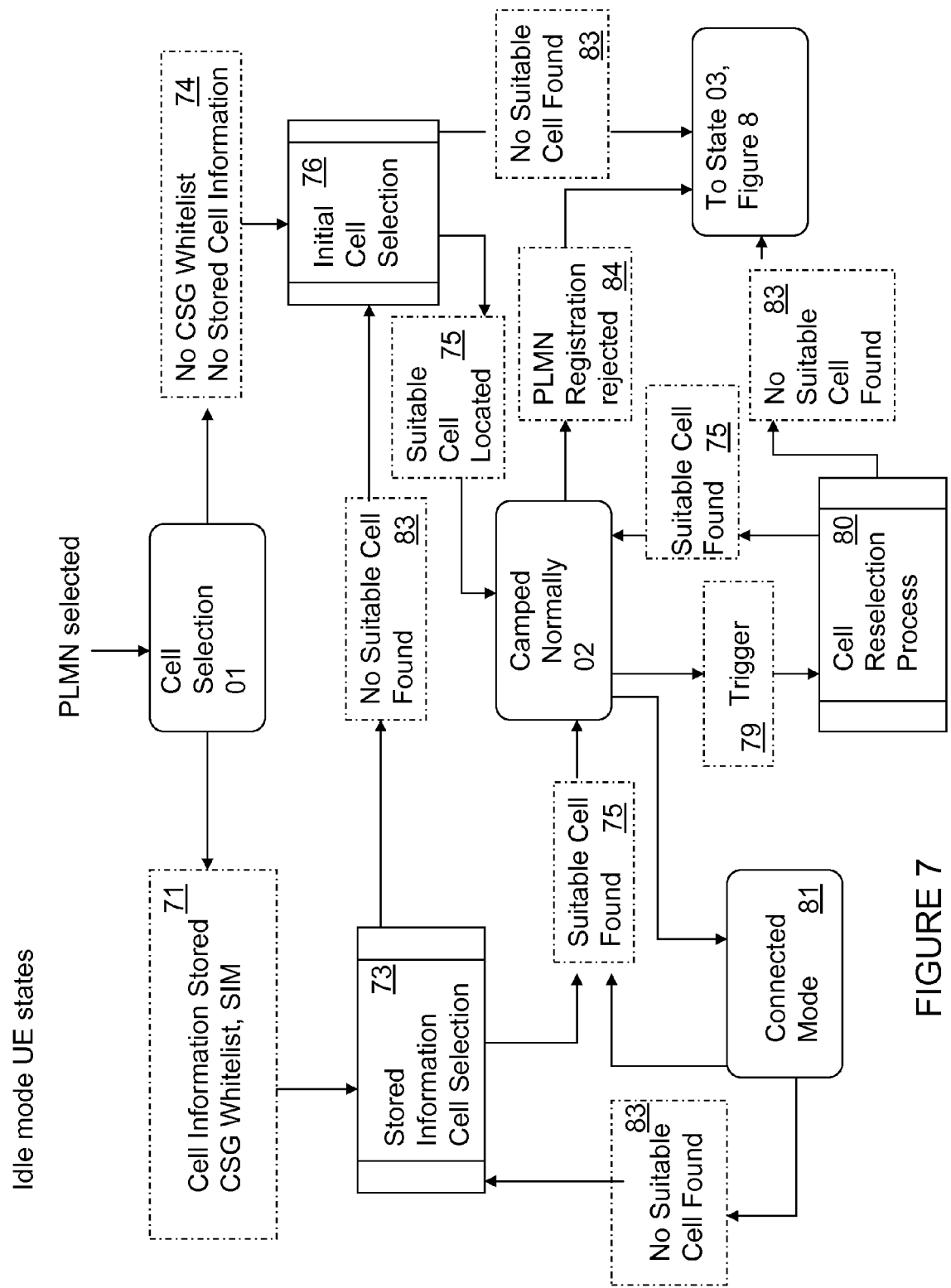
FIG. 7 illustrates a first portion of a state diagram that the UE of FIGS. 5 and 6 may use to implement embodiments of the present invention.

FIG. 7 depicts a simplified state diagram illustrating the states and the decision branches used in a first exemplary embodiment implementation of the cell selection and cell reselection method. In FIG. 7, the IDLE mode states for a UE are depicted. The top of the page depicts state "01," the Cell Selection state. This state is entered whenever the UE needs to change or connect to the PLMN. For example, on power up, if the UE detects a weak signal, or needs to change the network for some other reason, the UE will return to or enter state "01". The UE may also enter the Cell Selection state "01" when the user or the system indicates a selection or reselection of a PLMN, or a search for a new cell or CSG, is desired or when a reselection is needed.

In leaving from the Cell Selection state 01, the UE makes a determination. If there is stored information within the UE indicating a cell to be used for the PLMN, the UE looks for those cells first as depicted by block 71 in FIG. 7. If the stored information is present, the state diagram enters the "Stored Information Cell Selection", state 73 in FIG. 7. The stored CSG whitelist contains, as described above, a list of CSG identifiers that are permanent. These cells may include the home cell or eNB, and other cells that are considered to be permanent parts of the UE subscriber service. The UE may first attempt to locate one of those cells. In additional embodiments, but not in all embodiments, another portion of the stored CSG whitelist includes cells that have previously been successfully used (referred to as "camped" on). The UE will look for one of these "suitable" cells. A "suitable" cell is a cell that allows the UE to tune to its control channel and register with the network. Once registered, the UE can receive network information, receive radio access technology parameters ("RATs"), receive pages, and if needed, initiate a connection to receive or transmit. A CSG cell will provide a CSG ID in its broadcast beacon signal. The UE can then check the CSG ID against the CSG whitelist to determine if the UE is a member of the closed subscriber group for that cell. Thus, if a suitable cell is located, the state diagram transitions, via block 75, to the Camped Normally UE state, state 02 in FIG. 7.

If there is no stored CSG information in the UE and no CSG whitelist, the UE transitions via block 74 to a state labeled "Initial Cell Selection", block 76 in FIG. 7. In this state (block 76), the UE attempts to locate a suitable cell. A suitable cell for a UE without a CSG whitelist is one that is part of the selected PLMN and a cell that fulfills other "suitable cell" criteria that are provided by the system. In one alternative embodiment, the UE will search for any cell and indicate to the user that such a cell has been located. In other alternative embodiments, the UE may autonomously select a suitable cell according to measurement rules when a new cell is identified that is suitable for addition to the CSG whitelist.

Once a suitable cell is located, the UE transitions via block 75 to the "Camped Normally" state, UE idle mode state 02. Registration with the network is then performed. A registered UE is available for paging, can receive information and parameters, and can initiate a transition to a "Connected Mode" state to communicate with the network.

Periodically, a UE in the "Camped Normal" mode may need to reselect a cell. This reselection may be done according to a timer, or because the UE is mobile and is leaving the coverage area of the present cell, or for other reasons. In one alternative embodiment, if the CSG whitelist is modified so that the cell a UE is "camped" on is no longer part of the CSG whitelist, the UE should then terminate that connection and select a new cell by performing a reselection. The reasons for entering the "Cell Reselection Process" state are referred to here collectively as "triggers" and depicted as block 79 in FIG. 7. Triggers may include time outs or time lapses, location changes, reception changes, changes by a user command, changes by a system command, and other factors. In any event, on the detection of a "Trigger", the UE will transition to the "Cell Reselection Process" state 80 via block 79. The UE then may again attempt to find a suitable cell. In an exemplary method, cells on the CSG whitelist will be searched for first, starting with the permanent CSG whitelist, and then the temporary CSG whitelist. In any event, the Cell Reselection Process 80 ends if a suitable cell is found by the UE state diagram transitioning back to the Camped Normally state 02, via block 75 in FIG. 7.

The UE may, in alternative embodiments, also do autonomous scanning in a background scan to look for cells on the CSG whitelist, and based on various optimization parameters, may autonomously reselect a new cell to "camp" on if the newly identified cell is better than the prior cell based on some parametric information. Alternatively, the UE may alert the user to the newly identified cells and allow the user to input a reselection preference through an interface. In other words, when in the "Camped Normally" state, the UE may perform a variety of searches for cells on the CSG whitelist, using either the permanent CSG whitelist, the temporary CSG whitelist, or both. These may be done automatically, at user request, or at system request, at timed intervals or when measured reception parameters change. The cell search may be time limited so that when it is performed the UE battery is conserved.

If the UE is in the "Camped Normally" state and receives an appropriate page, the UE can transition to the "Connected Mode", state 81 in FIG. 7. When the transaction in the Connected Mode is completed, the UE may again transition to the "Stored Information Cell Selection" state, and again attempt to locate a suitable cell.

There are cases where no suitable cell can be located by the UE in its reception area. One case is illustrated in the diagram: if the UE is in "Camped Normally" state, state 02, and the attempt to register with the network is rejected as shown in the block 83, PLMN Registration Rejected, the UE may transition to the Any Cell Selection state, state 03, depicted in FIG. 8. Also, if the UE cannot locate a suitable cell in the Initial Cell Selection state, 76 in FIG. 7, and thus cannot enter the "Camped Normally" state, state 02, the UE may also transition to the Any Cell Selection state depicted in FIG. 8. Similarly, if the UE cannot exit the "Connected Mode" state 81 by finding a suitable cell, then it may transition to state 73, and if again no suitable cell is located, to the "Initial Cell Selection" state 76.

Figure 8:
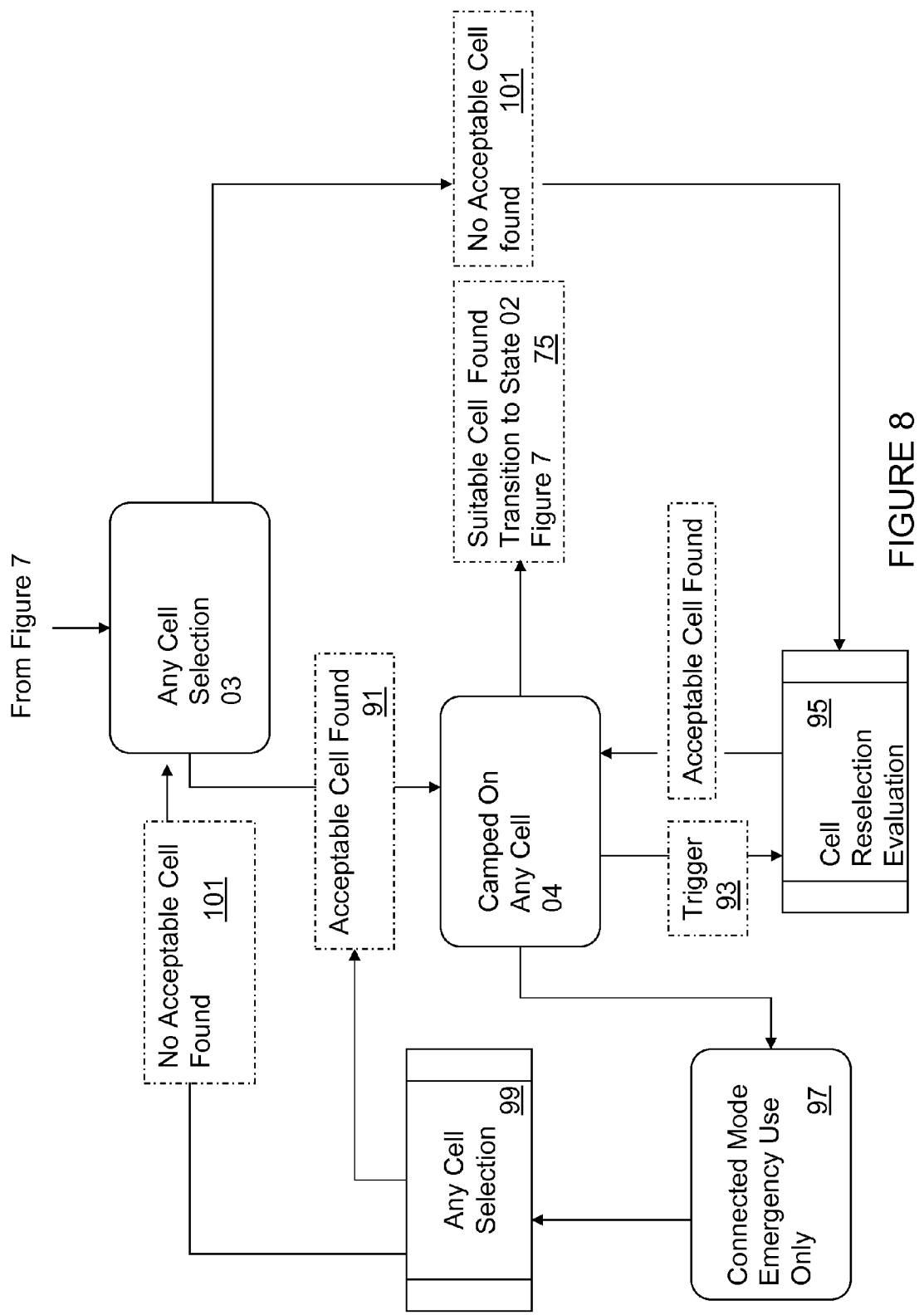
FIG. 8 illustrates a second portion of a state diagram that the UE of FIGS. 5 and 6 may use to implement embodiments of the present invention.

In FIG. 8, the any cell selection process is depicted. For the states shown in FIG. 8, the UE cannot "Camp Normally" in UE state 02, as no suitable cell has been located. In order to provide emergency services, however, the UE is still allowed to make a connection to a cell. In the first state of FIG. 8, "Any Cell Selection," state 03, the UE starts by looking for an "acceptable cell". If the UE finds an "acceptable cell," it transitions via block 91 to the "Camped on Any Cell" state, UE state 04. An "acceptable cell" is any cell that allows the connection, that is, the connection is not barred or prohibited, but is not a "suitable cell".

While the UE is in the "Camped on Any Cell" state 04, it can only receive pages for emergency services. This is clearly not a normally suitable situation for the UE (or the user) and the UE may therefore continue to evaluate additional cells that come into its reception area to find a suitable cell. If a suitable cell is located, the UE will transition via block 75 to the "Camped Normally," state 02 in FIG. 7. During the "Camped on Any Cell" state, the UE still may periodically perform a cell reselection process. For example, the UE may be changing locations (typically a UE is a mobile phone, such as a cell phone, car phone, or portable device such as a PDA or email communicator) and so the radio reception of the cell may become weak, or a timer may elapse, or a system or cell command may cause the UE to reselect. Again, these events are shown in FIG. 8 in block 93 as a "Trigger" and that event causes the UE to transition to the Cell Reselection Evaluation state, labeled 95 in FIG. 8. If a page is received for the UE while it is "Camped on Any Cell" in state 04, the UE can initiate a transition to the state labeled "Connected Mode Emergency Use Only" state labeled 97 in FIG. 8. Once the transaction in this state is complete, the UE must transition back to a Cell Selection state and if an "acceptable cell" is located, return to state 04, "Camped on Any Cell." In leaving the Connected Mode, Emergency Use Only state, the UE transitions to an Any Cell Selection state labeled 99 in FIG. 8 and again, attempts to locate an acceptable cell. If no acceptable cell is found, the state diagram may transition back to the Any Cell Selection state 03 through block 101 in FIG. 8.

The states of FIGS. 7 and 8 are an exemplary embodiment state diagram for implementing the cell selection and reselection process for a UE including support for the CSG and CSG whitelist functions of the various embodiments of the present invention. As is known to those skilled in the art, these states and the transitions between them may be combined or rearranged; the labels and numerals are not significant or limiting and may be changed without changing the meaning of, or the operation of, the states depicted and these alternative implementations are also contemplated as exemplary embodiments that fall within the scope of the invention and are covered by the appended claims.

In additional illustrative embodiments, the cell search and selection process may be controlled by the user by using the stored CSG whitelist. The UE may be configured to automatically or manually perform a limited cell search and cell selection process. For a non limiting example, the user could restrict the cell selection to eNode B stations having a CSG identifier that is on the permanent network portion of the UE CSG whitelist. Alternatively, the search could include cells or eNode B stations that are on the user permanent CSG whitelist or the search could be extended to include both portions. Alternatively, the UE could be configured to show a list of cells that are on any portion of the CSG whitelist and allow the user to select from the list. The user could also, as another alternative embodiment, specify certain cells on the CSG whitelist and restrict the search and selection process to only those cells.

In additional illustrative embodiments, the UE may be configured, either by the user, by the network, or by a service provider, to perform automatic searches for stations having a CSG identifier that is on the permanent whitelist. The UE, once such an eNode B station is located, could indicate that to the user, or autonomously select the base station based on configurations or preferences set by the user or by the service provider. This autonomous search could be performed as a background task at regular intervals or in response to a user or system command. The autonomous search may be limited in time when the UE performs it to conserve battery power.

In exemplary embodiments, the methods of managing the CSG whitelist may be applied to cell selection by the UE, PLMN search by the UE, cell or PLMN reselection by the UE, autonomous background searches by the UE when already "camped" on a cell, as non-limiting examples. Further, the user may configure the UE to automatically search for cells that are on the permanent portion of the whitelist, the temporary portion of the whitelist, the system only portion of the whitelist, and other partitions may be used with a user interface to manage the whitelist entries.

In other exemplary embodiments, when a CSG is deleted from the stored whitelist, the UE may deselect the currently selected cell (if the cell is a member of the CSG that was just deleted) and perform a search and reselection process.

Additional exemplary embodiments include a user interface for adding to the CSG whitelist. The UE can indicate cells that have CSGs that are available for the UE, and inquire of the user whether the CSG should be added to the CSG whitelist. This feature may be particularly efficient as a means of initializing a CSG whitelist for a newly activated UE, as the user carries the UE to his home, office, university and the like, the UE can indicate to the user that a cell is available with a CSG identifier that can be added to the whitelist, and the user interface can further allow the user to add the CSG identifier to the permanent list or to the temporary list. For example, cells in cafes, hotels and the like where the user may find it convenient to register on occasion could be added to the temporary part of the list. With cells in the home, office and other places, the user will often find it convenient to use the UE, which can be added to the user permanent whitelist. Use of the CSG whitelist speeds the cell selection process and saves battery power.

In an exemplary embodiment, a method is performed comprising: receiving and sending signals over a radio air interface; storing a list of closed subscriber groups, the stored list indicating a membership in the stored closed subscriber groups; partitioning the stored list of closed subscriber groups into a permanent stored portion and a temporary stored portion; receiving radio signals over the radio air interface including a closed subscriber group identifier; determining if the received closed subscriber group identifier corresponds to one of the closed subscriber groups on the stored list; and, responsive to the determining step, receiving a control channel.

In another exemplary embodiment, the above method is performed and further comprising: receiving radio signals including a closed subscriber group identifier from a plurality of network elements; determining that none of the received closed subscriber group identifiers corresponds to one of the closed subscriber groups on the stored list; indicating to a user that one or more of the network elements is available for connection; receiving a user command to add the closed subscriber group identifier corresponding to one of the network elements to one of the portions of the stored list; and storing the closed subscriber group identifier on the list of closed subscriber groups.

In another exemplary embodiment, the above method is performed and further comprising: storing a list of closed subscriber groups stored by providing non-volatile memory.

In another exemplary embodiment, the above method is performed and further comprising: partitioning the non-volatile memory into a user alterable section and a permanent section that is not user alterable.

In another exemplary embodiment, the above method is performed wherein the permanent section resides in a subscriber identity module ("SIM") card.

In another exemplary embodiment, the above method is performed and further comprising: following the receiving of the control channel, registering with a network associated with a network element transmitting the control channel; receiving a command to remove the closed subscriber group corresponding to the network element from the stored list of closed subscriber groups; and deselecting the network element.

In another exemplary embodiment, the above method is performed and further comprising: deleting the closed subscriber group corresponding to the network element from the stored list.

In another exemplary embodiment, the above method is performed and further comprising: providing a user interface operable to add closed subscriber groups to the stored list of closed subscriber groups.

In another exemplary embodiment, the above method is performed and further comprising: showing on a user interface a plurality of network elements available within reception range; receiving a command to add a closed subscriber group corresponding to one or more of the available network elements to the stored list of closed subscriber groups; and storing the closed subscriber group to the stored list of closed subscriber groups.

In another exemplary embodiment, the above method is performed and further comprising partitioning the user alterable portion of the stored list into a permanent portion and a temporary portion.

In another exemplary embodiment, the above method is performed and further comprising providing a user interface operable to selectively store a closed subscriber group identifier to the permanent portion and the temporary portion responsive to a user command.

In another exemplary embodiment, the above method is performed and further comprising: searching for a radio signal that contains a closed subscriber group identifier that is located on the stored list of closed subscriber groups; and indicating to the user a network element is available that is transmitting an identifier on the stored lists of closed subscriber groups.

In another exemplary embodiment, the above method is performed and further comprising: searching for a radio signal limited to searching for a radio signal that contains a closed subscriber group identifier on the permanent portion of the stored list.

In another exemplary embodiment, the above method is performed and further comprising: searching for a radio signal limited to searching for a radio signal that contains a closed subscriber group identifier on the temporary portion of the stored list.

In another exemplary embodiment, the above method is performed and further comprising: periodically searching for network elements transmitting radio signals indicating closed subscriber group information within reception range of the radio frequency transceiver; determining from stored parameters whether a network element is a member of a closed subscriber group on the stored list; deselecting the current selected network element; and selecting a network element located in the search for network elements.

In another exemplary embodiment, the above method is performed wherein periodically searching for network elements further comprises: periodically searching for network elements as a background task responsive to a predetermined elapsed time since the last selection of a network element.

In another exemplary embodiment, the above method is performed wherein periodically searching for network elements further comprises: periodically searching for network elements responsive to a user command.

In another exemplary embodiment, the above method is performed wherein periodically searching for network elements further comprises: periodically searching for network elements responsive to a change in reception of the radio signals of the previously selected network element.

In another exemplary embodiment, an apparatus is provided comprising: a radio frequency transceiver for receiving and sending radio signals over an air interface; a closed subscriber group storage handler for receiving system and user commands, operable to store closed subscriber group information; a system alterable memory portion coupled to the closed subscriber group storage handler, operable for storing closed subscriber group identifiers received from a system resource; and a user alterable memory portion coupled to the closed subscriber group storage handler, operable for storing closed subscriber group identifiers received from a user interface.

In another exemplary embodiment, the above apparatus is provided wherein the user alterable memory portion further comprises a permanent storage portion and a temporary storage portion.

In another exemplary embodiment, the above apparatus is provided wherein the user alterable memory portion further comprises non-volatile memory.

In another exemplary embodiment, the above apparatus is provided wherein the system alterable memory portion further comprises non-volatile memory.

In another exemplary embodiment, the above apparatus is provided wherein the system alterable memory portion further comprises a subscriber identity module ("SIM") card.

In another exemplary embodiment, the above apparatus is provided wherein the closed subscriber group storage handler is operable to receive commands to remove closed subscriber groups from the lists stored in the user equipment and further operable to delete the respective closed subscriber groups from the lists responsive to the commands.

In another exemplary embodiment, the above apparatus is provided wherein the radio frequency transceiver is operable to receive closed subscriber group identifier signals and further operable to compare the received identifier signals to the lists of closed subscriber groups stored in the user equipment, and is further operable to select a network element that transmits an identifier located on one of the stored lists and to tune to receive signals from that selected network element.

In another exemplary embodiment, the above apparatus is provided wherein the closed subscriber group storage handler is operable to receive a command to delete the selected one of the closed subscriber groups corresponding to the selected network element from one of the stored lists of closed subscriber groups; and wherein the radio frequency transceiver deselects the selected network element in response to the deletion of the closed subscriber group identifier from the stored list.

In another exemplary embodiment, the above apparatus is provided wherein the closed subscriber group storage handler is operable to receive a list of closed subscriber groups from a system resource and is further operable to store the received list of closed subscriber groups in the system alterable memory portion.

In another exemplary embodiment, the above apparatus is provided wherein the user equipment is a mobile radio transceiver.

In another exemplary embodiment, a computer readable storage medium is provided comprising instructions stored thereon that, when executed by programmable user equipment, cause the user equipment to perform: receiving and sending signals over a radio air interface; storing a list of closed subscriber groups, the stored list indicating a membership in the stored closed subscriber groups; partitioning the stored list into a permanent stored portion and a temporary stored portion; receiving radio signals over the radio air interface including a closed subscriber group identifier; determining if the received closed subscriber group identifier corresponds to one of the closed subscriber groups on the stored list; and, responsive to the determining step, receiving a control channel.

In another exemplary embodiment, the above computer readable storage medium is provided and further comprising instructions that, when executed, cause the user equipment to perform: receiving radio signals including a closed subscriber group identifier from a plurality of network elements; determining that none of the received closed subscriber group identifiers corresponds to one of the closed subscriber groups on the stored list; indicating to a user that one or more of the network elements is available for connection; receiving a user command to add the closed subscriber group identifier corresponding to one of the network elements to the stored list; and storing the closed subscriber group identifier on the list of closed subscriber groups.

In another exemplary embodiment, the above computer readable storage medium is provided further comprising instructions that, when executed, cause the user equipment to perform: following the receiving of the control channel, registering with a network associated with a network element transmitting the control channel; receiving a command to remove the closed subscriber group corresponding to the network element from the stored list of closed subscriber groups; and deselecting the network element.

In another exemplary embodiment, the above computer readable storage medium is provided, further comprising instructions that, when executed, cause the user equipment to perform: deleting the closed subscriber group corresponding to the network element from the stored list.

In another exemplary embodiment, the above computer readable storage medium is provided, further comprising instructions that, when executed, cause the user equipment to perform: providing a user interface operable to add closed subscriber groups to the stored list of closed subscriber groups.

In another exemplary embodiment, the above computer readable storage medium is provided, further comprising instructions that, when executed, cause the user equipment to perform: showing on a user interface a plurality of network elements available within reception range; receiving a command to add a closed subscriber group corresponding to one or more of the available network elements to the stored list of closed subscriber groups; and storing the closed subscriber group to the stored list of closed subscriber groups.

In another exemplary embodiment, an apparatus is provided, comprising: means for receiving and sending radio signals over an air interface; means for receiving system and user commands, operable to store closed subscriber group information; means for storing lists of system alterable closed subscriber group identifiers received from a system resource; and means for storing lists of closed subscriber group identifiers received from a user interface.

In another exemplary embodiment, the above apparatus is provided, further comprising: means for receiving commands to remove closed subscriber groups from the lists stored in the user equipment; and means for deleting the respective closed subscriber groups from the lists responsive to the commands.

In another exemplary embodiment, the above apparatus is provided, further comprising: means for receiving closed subscriber group identifier signals; means for comparing the received identifier signals to the lists of closed subscriber groups; means for selecting a network element that transmits an identifier located on one of the stored lists; and means for receiving signals from that selected network element.

In another exemplary embodiment, an integrated circuit is provided, comprising: a closed subscriber group storage handler for receiving system and user commands, operable to store and manage closed subscriber group information; a system alterable memory portion coupled to the closed subscriber group storage handler, operable for storing closed subscriber group identifiers received from a system resource; and a user alterable memory portion coupled to the closed subscriber group storage handler, operable for storing closed subscriber group identifiers received from a user interface.

In another exemplary embodiment, the above integrated circuit is provided, wherein the user alterable memory portion further comprises a permanent storage portion and a temporary storage portion.

In another exemplary embodiment, the above integrated circuit is provided, wherein the user alterable memory portion further comprises non-volatile memory.

In another exemplary embodiment, the above integrated circuit is provided, wherein the system alterable memory portion further comprises non-volatile memory.

Embodiments of the present invention provide solutions to a CSG function in UEs in the environment. User services enabling the user to manage and alter the stored CSG whitelist are provided. Selective cell search and reselection processes may be advantageously performed using the whitelist. The CSG whitelist enables the system to implement an eNode B base station including closed subscriber groups and with no impact on the MME. The exemplary embodiments of the present invention as presented herein address how to provide the existing services and also support UE devices including CSG functionality at a minimum cost and with as little wasted system bandwidth as possible.

Although various embodiments of the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to advantageously coordinate allocation of resources for user equipment to be handed over from a source base station to a target base station without contention and without a need for sharing timing information therebetween, as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
storing in a memory of a user equipment a list of closed subscriber groups, the stored list indicating a membership in the stored closed subscriber groups, the stored list including two different lists of stored closed subscriber groups comprising a system configurable list of stored closed subscriber groups and a user configurable list of stored closed subscriber groups so that the memory of the user equipment stores both of the two different lists of stored closed subscriber groups;
receiving a user command to search available network elements;
indicating to user the results of searching available network elements based on the stored list of closed subscriber groups; and
selecting a network element corresponding to the closed subscriber group indicated by a further user command.

2. The method of claim 1, further comprising:
receiving a radio signal including a closed subscriber group identifier from a plurality of network elements;
determining that one of the received closed subscriber group identifiers does not correspond to one of the closed subscriber groups on the stored list;
indicating to a user that one or more of the network elements is available for connection;
receiving a user command to add the closed subscriber group identifier corresponding to one of the network elements to the stored list; and
storing the closed subscriber group identifier on the list of closed subscriber groups.

3. The method of claim 2, further comprising:
following the receiving of the radio signals, registering with a network associated with one or more network elements transmitting the radio signals; and
storing the closed subscriber group identifier corresponding to one or more network elements of the network on the list of closed subscriber groups.

4. The method of claim 1, further comprising:
receiving a command to remove the closed subscriber group from the stored list of closed subscriber groups; and
removing the closed subscriber group from the stored list.

5. The method of claim 1, further comprising:
providing a user interface operable to add closed subscriber groups to the stored list of closed subscriber groups.

6. The method of claim 1, further comprising:
showing on a user interface a plurality of network elements available within reception range;
receiving a command to add a closed subscriber group corresponding to one or more of the available network elements to the stored list of closed subscriber groups; and
storing the closed subscriber group to the stored list of closed subscriber groups.

7. The method of claim 1, further comprising providing a user interface configured to selectively store a closed subscriber group identifier to the user configurable list, responsive to a user command.

8. The method of claim 1, wherein storing the user configurable list further comprises at least a storing selected from one of storing closed subscriber groups as permanent entries and storing closed subscriber groups as temporary entries on the user configurable list.

9. The method of claim 1, wherein the system configurable list is non-user-alterable and the user configurable list is user-alterable.

10. An apparatus, comprising:
a processor; and
a memory including computer program code, where the memory and computer program code are configured to, with the processor, cause the apparatus at least to perform,
storing in a memory of a user equipment a list of closed subscriber groups, the stored list indicating a membership in the stored closed subscriber groups, the stored list including two different lists of stored closed subscriber groups comprising a system configurable list of stored closed subscriber groups and a user configurable list of stored closed subscriber groups so that the memory of the user equipment stores both of the two different lists of stored closed subscriber groups;
receiving a user command to search available network elements;
indicating to a user the results of searching available network elements based on the stored list of closed subscriber groups; and
selecting a network element corresponding to the closed subscriber group indicated by a further user command.

11. The apparatus of claim 10 wherein the memory further comprises a user alterable memory portion coupled to a closed subscriber group storage handler, configured to store closed subscriber group identifiers received from a user.

12. The apparatus of claim 10, wherein the memory further comprises a system alterable memory portion coupled to a closed subscriber group storage handler, configured to store closed subscriber group identifiers received from a system resource.

13. The apparatus of claim 12, wherein the system alterable memory portion further comprises a subscriber identity module ("SIM") card.

14. The apparatus of claim 12, wherein a closed subscriber group storage handler is operable to receive a list of closed subscriber groups from the system resource and is further operable to store the received list of closed subscriber groups in the system alterable memory portion.

15. The apparatus of claim 10, wherein a closed subscriber group storage handler is configured to receive commands to remove closed subscriber groups from the lists stored in the user equipment and further configured to delete the respective closed subscriber groups from the stored lists responsive to the commands.

16. The apparatus of claim 10, wherein the apparatus further comprises a radio frequency transceiver configured to receive closed subscriber group identifier signals and further configured to compare the received identifier signals to the lists of closed subscriber groups stored in the user equipment, and further operable to select a network element that transmits an identifier located on one of the stored lists and to receive signals from that selected network element.

17. The apparatus of claim 10, wherein a closed subscriber group storage handler is configured to receive a command to delete the selected one of the closed subscriber groups corresponding to a selected network element from one of the stored lists of closed subscriber groups; and wherein the apparatus deselects the selected network element in response to the deletion of a closed subscriber group identifier from the stored list.

18. The apparatus of claim 11 wherein the user alterable memory portion further comprises a permanent entry portion configured to store closed subscriber groups permanently and a temporary entry portion configured to store closed subscriber groups temporarily.

19. A non-transitory computer readable medium storing a program of machine-readable instructions executable by a digital processing apparatus to perform operations comprising:
storing in a memory of a user equipment a list of closed subscriber groups in a user equipment, the stored list indicating a membership in the stored closed subscriber groups, the stored list including two different lists of stored closed subscriber groups comprising a system configurable list of stored closed subscriber groups and a user configurable list of stored closed subscriber groups so that the memory of the user equipment stores both of the two different lists of stored closed subscriber groups;
receiving a user command to search available network elements based on the stored list of closed subscriber groups;
indicating to a user the results of searching available network elements based on the stored list of closed subscriber groups; and
selecting a network element corresponding to the closed subscriber group indicated by a further user command.

20. A system, comprising:
a user equipment, further comprising:
a closed subscriber group storage handler configured to store a list of closed subscriber groups, the stored list stored in a memory of the user equipment and including two different lists of stored closed subscriber groups comprising a system configurable list of stored closed subscriber groups and a user configurable list of stored closed subscriber groups so that the memory of the user equipment stores both of the two different lists of stored closed subscriber groups;
a system alterable memory portion coupled to the closed subscriber group storage handler, configured to store the system configurable list as a first set of closed subscriber group identifiers or a first list of closed subscriber groups indicating a membership in the stored subscriber groups received from a system resource; and
a user alterable memory portion coupled to the closed subscriber group storage handler, configured to store the user configurable list as a second set of closed subscriber group identifiers or a second list of closed subscriber groups indicating a membership in the stored subscriber groups received from a user; and
a base station configured to communicate closed subscriber group signals with the user equipment over an air interface using radio frequency signaling,
wherein the user enters a search command to search available network elements based upon the first or second sets of closed subscriber group identifiers or the first or second lists of closed subscriber groups and the network element is selected corresponding to the closed subscriber group indicated by result of the search command.

* * * * *